United States Patent
El-Sallabi et al.

(10) Patent No.: US 10,964,055 B2
(45) Date of Patent: Mar. 30, 2021

(54) METHODS AND SYSTEMS FOR SILENT OBJECT POSITIONING WITH IMAGE SENSORS

(71) Applicant: QATAR ARMED FORCES, Doha (QA)

(72) Inventors: Hassan Mohamed El-Sallabi, Doha (QA); Abdulaziz Falah Aldosari, Doha (QA)

(73) Assignee: QATAR ARMED FORCES, Doha (QA)

( * ) Notice: Subject to any disclaimer, the term of this patent is extended or adjusted under 35 U.S.C. 154(b) by 0 days.

(21) Appl. No.: 16/362,272

(22) Filed: Mar. 22, 2019

(65) Prior Publication Data

US 2020/0302641 A1 Sep. 24, 2020

(51) Int. Cl.
| | | |
|---|---|---|
| G06T 7/73 | (2017.01) | |
| H04N 5/247 | (2006.01) | |
| G06T 7/292 | (2017.01) | |
| G06T 7/246 | (2017.01) | |

(52) U.S. Cl.
CPC .............. *G06T 7/74* (2017.01); *G06T 7/248* (2017.01); *G06T 7/292* (2017.01); *H04N 5/247* (2013.01); *G06T 2207/10048* (2013.01); *G06T 2207/20076* (2013.01); *G06T 2207/30232* (2013.01)

(58) Field of Classification Search
CPC .......... G06T 7/74; G06T 7/292; G06T 7/248; G06T 2207/10048; G06T 2207/20076; G06T 2207/30232; H04N 5/247
USPC .......................................................... 348/159
See application file for complete search history.

(56) References Cited

U.S. PATENT DOCUMENTS

| | | | |
|---|---|---|---|
| 6,795,966 B1* | 9/2004 | Lim | G06F 11/1438 718/1 |
| 9,575,394 B1* | 2/2017 | Wallace | H04N 5/247 |
| 2011/0164108 A1 | 7/2011 | Bates et al. | |
| 2011/0178658 A1 | 7/2011 | Kotaba et al. | |
| 2012/0044355 A1* | 2/2012 | Jamtgaard | G01S 5/00 348/159 |
| 2016/0119541 A1* | 4/2016 | Alvarado-Moya | G06T 3/4038 348/38 |
| 2019/0108648 A1* | 4/2019 | Lee | G01S 5/16 |

FOREIGN PATENT DOCUMENTS

CN 103149939 B 10/2015

* cited by examiner

*Primary Examiner* — Matthew K Kwan
(74) *Attorney, Agent, or Firm* — K&L Gates LLP

(57) ABSTRACT

A system and method for detecting, positioning, and tracking objects, including drones, is provided. One provided method includes calculating first estimated location parameters of an object based on a first image from a first image sensor. The method also includes calculating second estimated location parameters of the object based on a second image from a second image sensor. Certain embodiments may also combine the first and second estimated location to determine first physical location parameters of the object.

21 Claims, 8 Drawing Sheets

METHODS AND SYSTEMS FOR SILENT OBJECT POSITIONING WITH IMAGE SENSORS

BACKGROUND

The widespread availability of micro-drones and their rapid technological improvement represents a new generation of potential threats to safety and security. Lately, there are more drone incidents that endanger the national security of different countries. For example, micro-drones have been used in military operations to disable very sophisticated and expensive military weapons. All over the world, incidents with universally available micro-drones have revealed a security gap with regards to critical installations and infrastructures. Easy to make, cheap to buy, simple to fly, and hard to detect, small drones—many commercially available—are becoming major concerns to military forces and security operations. There have been reports of micro-drones endangering air traffic, smuggling drugs and weapons across borders and into prisons, and drone surveillance of sensitive sites such as nuclear power plants and VIP homes.

SUMMARY

The present disclosure presents new and innovative methods and systems for silently tracking object locations with image sensors. In one embodiment, method for identifying an object in a three-dimensional (3-D) space is provided, comprising calculating, with a first image from a first image sensor, first estimated location parameters of the object relative to the first image sensor at a first time, calculating, with a second image from a second image sensor, second estimated location parameters of the object relative to the second image sensor at the first time, and combining the first and second estimated location parameters to determine first physical location parameters of the object at the first time.

In another embodiment, the method may further comprise calculating, with a third image from a third image sensor, third estimated location parameters of the object relative to the third image sensor at the first time, and wherein determining the first physical location parameters of the object at the first time further comprises combining the first, second, and third estimated location parameters.

In a further embodiment, the first, second, and third image sensors are all located at a first monitoring station, and wherein the first physical location parameters of the object are relative to the first monitoring station.

In a still further embodiment, the method further comprises receiving, from a second monitoring station, second physical location parameters of the object relative to the second monitoring station, and combining the first and second physical location parameters to generate an estimated physical location of the object in the 3-D space.

In another embodiment, the method further comprises receiving, from a third monitoring station, third physical location parameters of the object relative to the third monitoring station, and the estimated physical location further comprises combining the first, second, and third physical location parameters.

In yet another embodiment, calculating the first estimated location parameters comprises calculating a first probability space of the location of the object relative to the first image sensor, calculating the second estimated location parameters comprises calculating a second probability space of the location of the object relative to the second image sensor. In such an embodiment, calculating the first physical location parameters may also comprise calculating a physical location probability space of the location of the object relative to the first and second image sensors based on the first and second probability spaces, and calculating a maximum value of the physical location probability space.

In a further embodiment, the first physical location parameters comprise a first physical location probability space, the second physical location parameters comprise a second physical location probability space, and the third physical location parameters comprise a third physical location probability space. In such embodiments, determining the estimated physical location may further comprise calculating an overall probability space relative to the first, second, and third monitoring stations based on the first, second, and third physical location probability spaces, and selecting the maximum value of the overall probability space as the estimated location.

In a still further embodiment, the method further comprises repeating the steps of the method to calculate fourth physical location parameters of the object relative to the first and second image sensors at a second time.

In another embodiment, the method further comprises storing the first and fourth physical location parameters at the first time and the second time, respectively.

In yet another embodiment, the method further comprises determining the fourth physical location parameters of the object at the second time based on the first physical location parameter by representing the first physical location parameters with a first state vector of a state machine, calculating a state transition based on the first state vector and a rate of change vector, applying the state transition to the first state vector to generate a second state vector; and calculating the fourth physical location parameters based on the second state vector.

In a further embodiment, one or both of the first and second image sensor include a spherical arrangement of multiple cameras.

In a still further embodiment, the one or both of the first and second image sensors are implemented as a sensor selected from the group consisting of an optical sensor, an electro-optical (EO) sensor, and an infrared (IR) sensor.

In another embodiment, a system for identifying an object in three-dimensional (3-D) space may be provided, comprising a sensor module comprising a first image sensor and a second image sensor and a location parameter estimator configured to calculate, with a first image from the first image sensor, first estimated location parameters of the object relative to the first image sensor at a first time and calculate, with a second image from the second image sensor, second estimated location parameters of the object relative to the second image sensor at the first time. The system may also include a main station configured to combine the first and second estimated location parameters to determine first physical location parameters of the object at the first time relative to the sensor module.

In yet another embodiment, the system may further comprise a target detector configured to detect object locations within images based on pixel values of occupied pixels of the images.

In a further embodiment, the sensor module further comprises a third image sensor, the location parameter estimator is further configured to calculate, with a third image from the third image sensor, third estimated location parameters of the object relative to the third image sensor at the first time, and the main station is further configured combine the first, second, and third estimated location parameters to determine the first physical location parameters of the object at the first time.

In a still further embodiment, the sensor module is located at a first monitoring station.

In another embodiment, the system further comprises a second monitoring station and a third monitoring station and the main station is further configured to receive, from the second monitoring station, second physical location parameters of the object relative to the second monitoring station, receive, from a third monitoring station, third physical location parameters of the object relative to the third monitoring station, and combine the first and second physical location parameters to generate an estimated physical location of the object in the 3-D space.

In yet another embodiment, the location parameter estimator, when calculating the first and second estimated locations, is configured to calculate a first probability space of the location of the object relative to the first image sensor, and calculate a second probability space of the location of the object relative to the second image sensor. In such embodiments, the main station, when determining the first physical location parameters, may be configured to calculate a physical location probability space of the location of the object relative to the sensor module based on the first and second probability spaces, and calculate a maximum value of the physical location probability space.

In a further embodiment, the main station, when determining the second physical 3-D location of the object at the second time based on the first physical 3-D location, is configured to represent the first physical location parameters with a first state vector of a state machine, calculate a state transition based on the first state vector and a rate of change vector, apply the state transition to the first state vector to generate a second state vector, and calculate the second physical location parameters based on the second state vector.

In a still further embodiment, a non-transitory, computer-readable medium is provided, storing instruction which, when executed by a processor, cause the processor to calculate, with a first image from a first image sensor, first estimated location parameters of an object relative to the first image sensor at a first time, calculate, with a second image from a second image sensor, second estimated location parameters of the object relative to the second image sensor at the first time, and combine the first and second estimated location parameters to determine first physical location parameters of the object at the first time relative to the sensor module.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
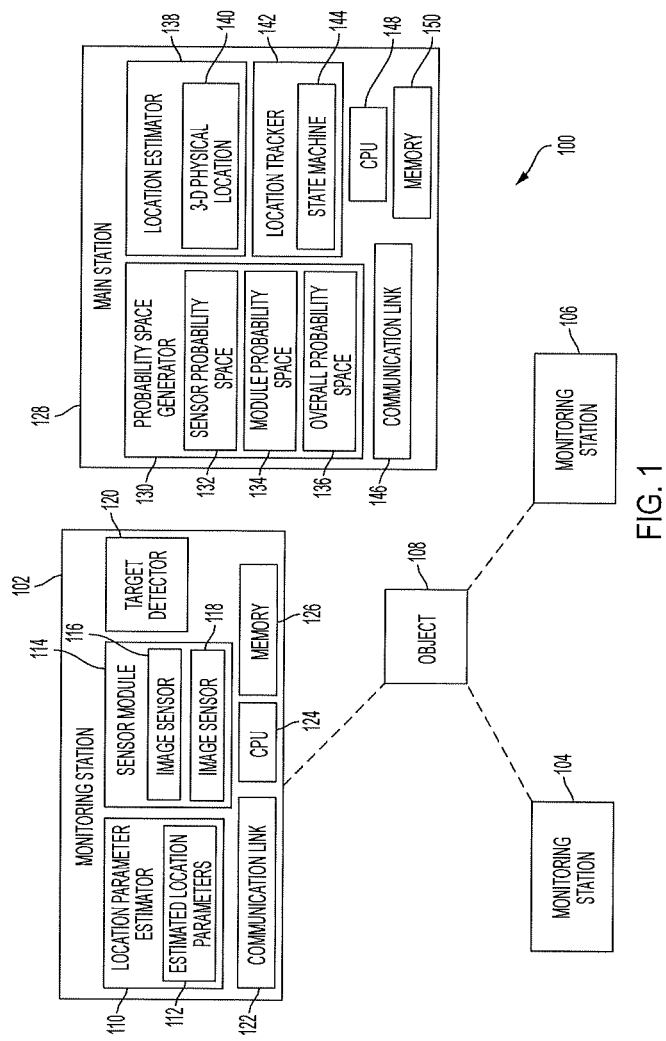
FIG. 1 illustrates a system according to an exemplary embodiment of the present disclosure.

Drone technology is progressing incredibly rapidly. As drone technology improves, price decreases and range increases—creating more opportunities for dangerous and/or criminal misuse. Modern security infrastructure used to limit access to sensitive locations is minimally effective against drones because of their smaller size. Drones can be transported easily (e.g., in a trunk of a car or in a backpack), and can therefore be launched from many public accessible areas (e.g., parks, parking lots, city streets, rivers, highways). As their ranges increase, drones can arrive at a destination several kilometers away within a few minutes.

These drones can be used to fly over fences and walls and can escape detection by traditional radar sensors, which are designed to track larger objects such as aircraft. Radar techniques used to identify and track drones suffer from high failure rates, including failing to identify drones and falsely identifying drones where there are none. There is therefore an ever-increasing need to be able to detect and neutralize these small drones. Additional problems with this technology include detecting small objects like drones while also distinguishing them from other small objects (e.g., birds). Further, once an object is detected, its location needs to be continuously tracked to monitor movement and updated location.

One innovative solution to this problem is to use image sensors to identify and track such objects. For example, optical sensors, electro-optical (EO) sensors, or infrared (IR) sensors may be used to visually monitor an area in may direct view of the sensor. When an object to be detected enters direct view of the sensor, the sensor may capture an image of the object that is then used to calculate an estimated location of the object relative to the sensor. Relying on a single sensor may introduce accuracy issues, so more than one sensor may be used to monitor an area. Therefore, a second image sensor may also monitor the area and, when the object enters direct view of the second sensor, a second estimated location may be calculated that represents the location of the object relative to the second sensor. Similar implementations may be used with three, four, or more sensors. Once the estimated location is calculated, the estimated locations may be combined to determine a 3-D physical location of the object. These techniques may be repeated as the object moves to track the movement of the object within the monitored area. To improve accuracy, a state machine may be used to estimate a location of the object over time based on additional, subsequent images captured by the image sensors. In certain embodiments, to increase the scope of the monitored area, the image sensors may be contained within a sensor module containing more than one sensor (e.g., multiple sensors arranged in a spherical array).

Such a system may effectively operate as a silent tracking system, as the image sensors do not have to transmit any signals to collect the data necessary to detect and track the object. Additionally, because the system relies on image sensors rather than radar sensors, it may more accurately detect and track small objects, which conventional radar systems cannot detect. Further, although the above example was discussed in the context of drones, the system may also be used to detect and monitor larger objects, such as aircraft, or smaller objects. In such implementations, the system may be preferred because of its silent characteristics.

FIG. 1 depicts a system 100 according to an exemplary embodiment of the present disclosure. The system 100 includes a main station 128, monitoring stations 102, 104, 106, and an object 108 whose presence is to be detected and whose location is to be positioned and tracked. The object 108 may include a drone, and aircraft, a projectile, a missile, and unmanned aerial vehicle (UAV), a bird, or any other object whose location is desired to be tracked. The monitoring stations 102, 104, 106 may be configured to gather information that is to be used to detect and track the location of the object 108 and may transmit that data to the main station. The main station 128 may be configured to receive data (e.g., visual data, estimated location parameters) from the monitoring stations 102, 104, 106 may be configured to estimate the object 108's position based on the received data.

Although only depicted for the monitoring station 102, the monitoring stations 102, 104, 106 may each include a sensor module 114 containing images sensors 116, 118, a target detector 120, location parameter estimator 110, a communication link 122, a CPU 124, and a memory 126. The image sensors 116, 118 may include one or more EO and/or IR sensors. Additionally, the image sensors 116, 118 may be arranged within the sensor module 114 as an array, or in a spherical arrangement. The target detector 120 may be configured to detect when the object 108 enters the monitoring area of an image sensor 116, 118 of the sensor module 114 of the monitoring station 102, 104, 106. The target detector 120 may be configured to recognize the object 108 based on its shape (e.g., using heuristic or machine learning principles). The location parameter estimator 110 may be configured to generate estimated location parameters 112 corresponding to an estimated relative location of the object 108 to the image sensor 116, 118 or the sensor module 114 (e.g., a relative angular position of the object 108. For example, each image sensor 116 may correspond to a set of estimated location parameters 112 estimating the relative location between that sensor 116, 118 and the object 108. In certain implementations, as will be discussed greater below, the estimated location parameters 112 may be calculated in terms of an estimated azimuthal and elevational angle within the field of view of the image sensor 116, 118. The communication link 122 for each monitoring station 102, 104, 106 may connect to the communication link 146 of the main station 128 to transmit data (e.g., estimated locations, visual data, or estimated location data) to the main station 128 for further processing. The communication link 122 may be implemented as one or more wired (e.g., Ethernet, coaxial cable) or wireless (e.g., W-Fi, Bluetooth, cellular data) interfaces and may be implemented using a private network (e.g., a local network) or a public network (e.g., the Internet).

The CPU 124 and the memory 126 may implement one or more of the monitoring station 102 features, such as the location parameter estimator 110, the sensor module, and/or the target detector 120. For example, the memory 126 may contain instructions which, when executed by the CPU 124 may perform one or more of the operational features of the monitoring station 102.

The main station 128 includes a probability space generator 130, a location estimator 138, a location tracker 142, a CPU 148, and a memory 150. The probability space generator 130 stores a sensor probability space 132, a module probability space 134, and an overall probability space 136. Each of these probability spaces may indicate an estimated range of positions for the object 108. For example, the sensor probability spaces 132 may be generated based on one or more estimated location parameters 112 (e.g., current estimated location parameters and/or past estimated location parameters) from the monitoring stations 102, 104, 106. For example, in implementations with more than one image sensor 116, 118 in each sensor module 114, each image sensor 116, 118 may have a sensor probability space 132 generated by the probability space generator 130 based on the data generated by that sensor 116, 118. Similarly, in such implementations with multiple image sensors 116, 118, the module probability space 134 may be generated based on the plurality of image sensors 116, 118 within each sensor module 114 of the monitoring stations 102, 104, 106. In these implementations, the mount probability spaces 134 may be based on the sensor probability spaces 134 for the sensor module 114 corresponding to each image sensor 116, 118. Similarly, the object probability space 136 may represent an estimated range of potential positions of the object 108 and may be generated based on the mount probability spaces 134 and/or the sensor probability spaces 132.

The main station 128 also includes a location estimator storing a 3-D physical location 140 of the object 108. The location estimator 138 may be configured to estimate the 3-D physical 140 location based on one or more probability spaces 132, 134, 136. For example, the location estimator 138 may estimate the 3-D physical location 140 by selecting a location within the overall probability space 136. The location tracker 142 stores a state machine 144, which may be used to predict and track the location of the object 108 over time based on the objects location at previous times, or based on past location estimates for other objects.

Figure 2:
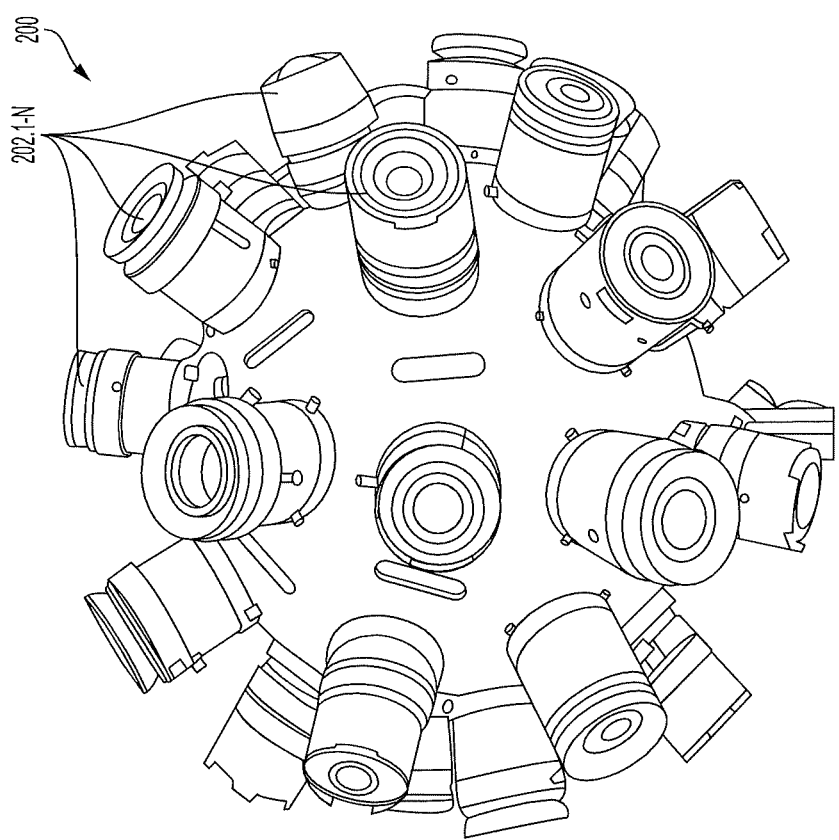
FIG. 2 illustrates an example sensor module according to an exemplary embodiment of the present disclosure.

FIG. 2 depicts an example sensor module 200 according to an exemplary embodiment of the present disclosure. The sensor module 200 includes multiple image sensors 202.1-N, which may include one or more optical, EO, and IR sensors. As depicted, each of the image sensors 202.1-N is identical, but certain implementations may include image sensors that differ from one another. For example, the sensor module 200 may include a mix of optical, EO, and IR sensors to improve performance at different lighting conditions or to detect and track objects of different sizes. The number of image sensors (N) included in the sensor module 200 may be selected to balance performance and expense with accuracy. For example, as the number of image sensors N in the sensor module 200 increases, the overall cost of the sensor module 200 may increase. Likewise, a larger number of image sensors (N) may collect a larger amount of visual data, which may require more time to analyze. However, additional image sensors 202.1-N may also increase the accuracy of an object tracking system, such as the system 100, for example by increasing the number of image sensors that have a view of the object at a given time.

Further, the sensor module 200 is depicted as having the image sensors 202.1-N arranged in a sphere or semi-sphere, which may be beneficial for increasing the monitoring area on an angular basis. However, the sensor module may, in other implementations, have image sensors 202.1-N arranged differently. For example, the image sensors 202.1-N may be arranged as an array, a line, or a circle. Additionally, although the sensor module 200 is depicted as including multiple image sensors 202.1-N, certain limitations of the sensor module 200 may only include a single sensor, or may include fewer sensors (e.g., 2, 3, or 4 image sensors).

Figure 3:
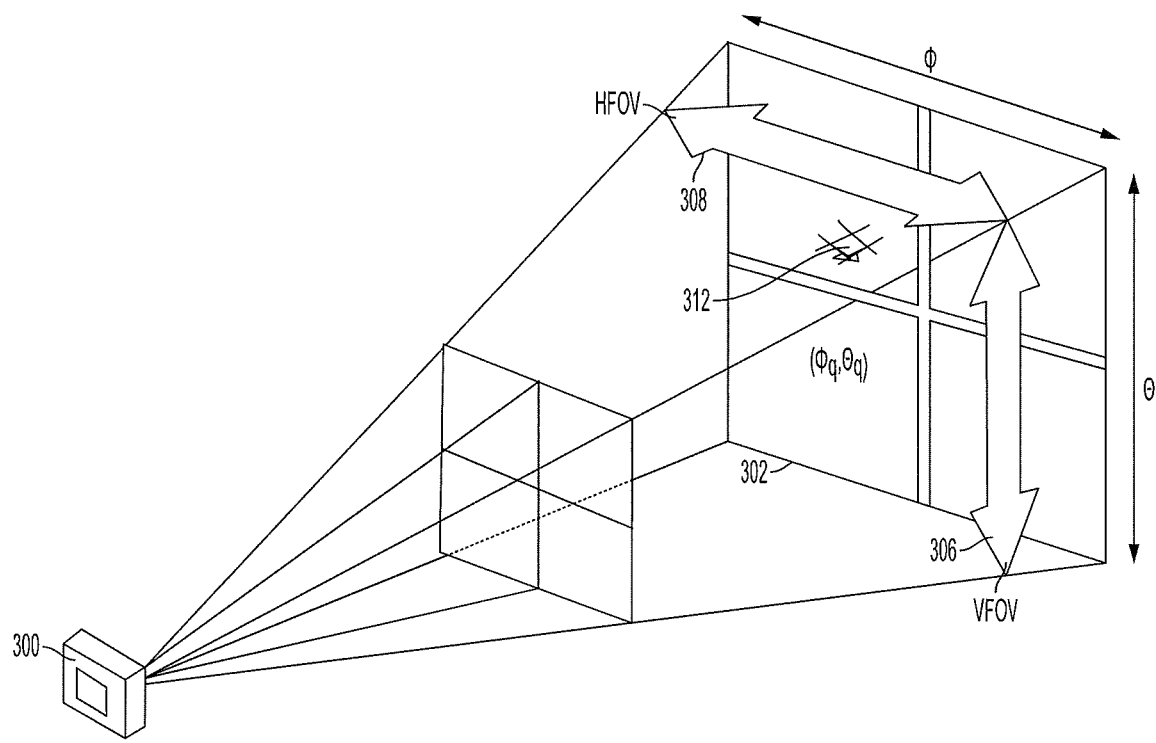
FIG. 3 illustrates an image sensor according to an exemplary embodiment of the present disclosure.

FIG. 3 depicts an image sensor 300 according to an exemplary embodiment of the present disclosure. The image sensor 300 may be an implementation of the image sensors 116, 118, 202.1-N discussed above in connection with the system 100 and the sensor module 200. For example, the image sensor 300 may be an EO sensor or an IR sensor may be used to detect and track the location of an object 312, such as a drone. The image sensor 300 may have a field of view (FOV) 302. The FOV may be defined by a horizontal field of view (HFOV) 308 and a vertical field of view (VFOV) 306. The HFOV 308 and the VFOV 306 may be defined in angular terms corresponding to the horizontal angle $\Phi$ and vertical angle $\Theta$ that the image sensor 300 is capable of viewing. The FOV 302 and the HFOV 308 and VFOV 306 may define the angular range over which the image sensor 300 is capable of monitoring and therefore the angular range that objects 312 can be reliably sensed by the sensor 300. The FOV 302 may be determined by the sensor's focal length (e.g., a longer focal length may result in a decreased the FOV 302 and a shorter focal length may result in an increased FOV 302).

The image sensor 300 may be configured to capture one or more images. The number of pixels in the image is determined by resolution of the image sensor 300. Each pixel of an image captured by the image sensor 300 (which may be located at position p) may be identified by coordinates $(\Phi_{p,q} \pm m\Delta\Phi, \Theta_{p,q} \pm n\Delta\Theta)$, where $\Delta\Phi$, $\Delta\Theta$ respectively define the pixel angular resolution in horizontal and vertical offset from $\Phi_{p,q}$ and $\Theta_{p,q}$, in positive or negative directions, where n and m are pixel numbers in x and y direction (where $\Phi_{p,q}$ and $\Theta_{p,q}$ represent the origin of the captured image). The values of $\Delta\Phi$ and $\Delta\Theta$ may be directly related to the resolution of the image sensor 300. For example, an image sensor 300 with a higher resolution may have smaller values for $\Delta\Phi$ and $\Delta\Theta$. The resolution of the image sensor 300 may also determine the angular accuracy of the estimated position of an object 312 relative to pointing directions. For example, a higher resolution for the image sensor 300 may allow for greater distinction between objects 312 angularly close to one another and thus result in better location estimation for each object. When an object 312 is within the FOV 302 of the image sensor 300, the object's position may be denoted angularly as the relative angle within the FOV. For example, the location of the object 312 may be denoted as $(\Phi_q, \Theta_q)$, where q corresponds to an identifier of the object 312.

Relatedly, the accuracy of positioning and tracking of a moving object may be a function of the update rates of image sensor 300, which may be described in frames per second. The update rate may determine the latency of the system and the time delay between the object 312 movement and the report of a new position. The number of pixels that correspond to a detected object may depend on its size and distance from object to the image sensor 300. The image sensor 300 may also be configured to zoom in on detected objects 312. Such zooming may increase the angular size of the object 312 and thus increase the accuracy of the estimated position of the object 312. In certain embodiments, the object 312 may be detected by several image sensors 300 from the same sensor module 114 (e.g., mounted on the same spherical mount base or mounted on separate sensor modules to improve tracking accuracy). Image sensors placed on a spherical mount may also allow smooth positioning and tracking of objects as they move from FOV of one image sensor and its neighbors to the FOV of another camera and its neighbors.

Figure 4:
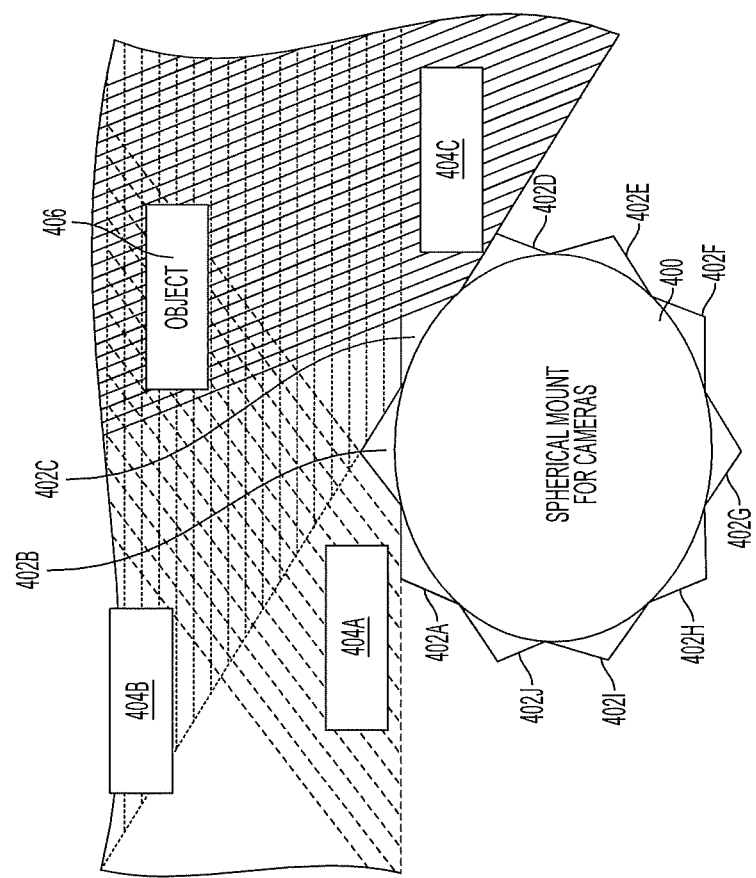
FIG. 4 illustrates a top-down view of a sensor module according to an exemplary embodiment of the present disclosure.

FIG. 4 depicts a top-down view of a sensor module 400 according to an exemplary embodiment of the present disclosure. The sensor module 400 may be part of an object tracking system, such as the system 100 and may be an example implementation of the sensor module 114. The sensor module 400 includes a plurality of image sensors 402A-J. The FOVs 404 A-C for the image sensors 402A-C are depicted and overlap near the location of object 406.

The sensor module 400 may be configured to use the image sensors 402A-J to detect and track the location of the object 406. Accordingly, when the object 406 enters the FOVs 404 A-C, the sensor module 400 may capture an image of the object 406 and detect that the object 406 is a target whose location is to be positioned and tracked. The sensor module 400 may then estimate location parameters 112 for the object based on the image. Because the object 406 is in the FOV 404A-C of multiple image sensors 402A-C, the sensor module 400 may be configured to capture an image of the object with each of these image sensors 402A-C. The sensor module 400 may then estimate the location parameters 112 for the object 406 based on each of the images captured by the image sensors 402A-C. For example, because each of the image sensors 402A-C views the object 406 from a different angle, the different perspectives may offer additional location information. For example, the estimated location parameters may include an estimated angular position (e.g., $\Phi_q$, $\Theta_q$ of FIG. 3) of the object 406 relative to each image sensor 402A-C. The angular positions estimated for each image and/or image sensor 402A-C may then be assembled into an estimated position of the object. The accuracy of the system may be further increased by distributing multiple sensor modules 400 over a monitoring area. Collecting multiple estimated positions from these additional sensor modules may provide additional location information and thereby increase the accuracy of the estimated position of the object 406.

In certain implementations, the estimated location parameters 112 and/or the images of the object 406 may be transmitted (e.g., by a communication link 122) to the main station 128 for further processing. For example, the sensor module 400 may be one of multiple sensor modules within the system 100, and the estimated location parameters 112 for the other sensor modules may be combined with those from the sensor module 400 to estimate a 3-D physical location 140 of the object. As another example, where an angular position is estimated for each image of the object 406 captured by the image sensors, the angular positions may be transmitted to the main station. The main station 128 may then combine these in good positions into an estimated 3-D physical location 140 for the object 406 relative to the sensor module 400.

Figure 5:
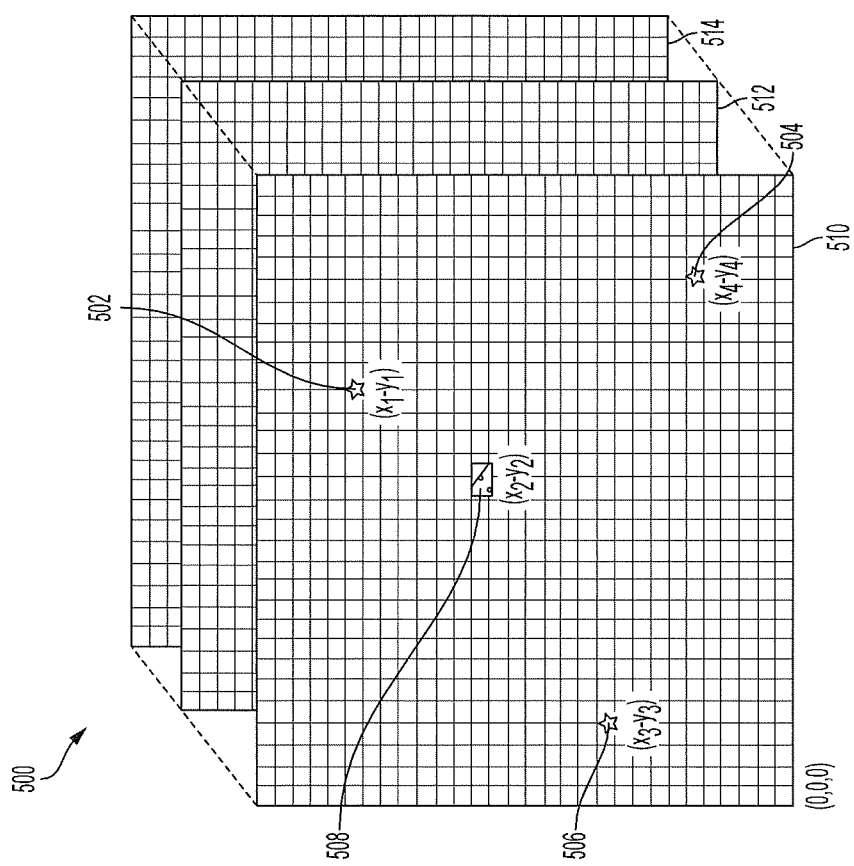
FIG. 5 illustrates an example location estimation operation according to an exemplary embodiment of the present disclosure.

FIG. 5 depicts an example location estimation operation 500 according to an exemplary embodiment of the present disclosure. The operation 500 may be performed to determine and track the location of an object 508 within a monitoring area. For example, the method 500 may be performed by the system 100 to detect and track the location of a drone, represented by the object 508. The operation 500 includes monitoring stations 502, 504, 506 and an object 508. The sensor modules 502, 504, 506 may be configured to use multiple image sensors to estimate an angular position of the object 508. For example, the sensor modules may be implemented as the sensor modules 114, 200, 400. The monitoring area monitored by the sensor modules 502, 504, 506 may be 3-dimensional, whereas the images captured by the image sensors 114, 116, 202.1-N, 300, 402A-J of the sensor modules 502, 504, 506 may be 2-dimensional. Accordingly, to estimate the three-dimensional location of the object 508, the monitoring area may be divided into a stack of planes of pixels 510, 512, 514. Each plane 510, 512, 514 may correspond to a different altitude, or height above ground in the monitoring area. The number of stacked planes used may depend on the resolution of the image sensors 114, 116, 202.1-N, 300, 402A-J of the sensor modules 502, 504, 506 in the vertical direction. Higher vertical resolutions may enable more planes, which may allow for greater accuracy in the vertical dimension. In combination the planes 510, 512, 514 may comprise a 3-dimensional grid.

Figure 6:
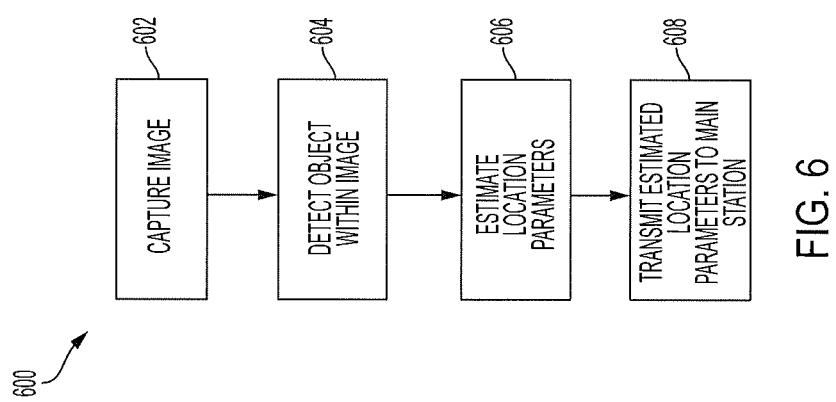
FIG. 6 illustrates a method according to an exemplary embodiment of the present disclosure.

FIG. 6 depicts a method 600 according to an exemplary embodiment of the present disclosure. The method 600 may be performed by a monitoring station 102, 104, 106 to estimate the location parameters 112 for an object 108, 312, 406, 508 based on an image or images captured by image sensors. For example, if the monitoring station 102, 104, 106 includes a sensor module 114, 200, 400 with multiple image sensors 114, 116, 202.1-N, 300, 402A-J, the monitoring station 102, 104, 106 may perform this method for each image captured the image sensors 114, 116, 202.1-N, 300, 402A-J. By performing this method, the monitoring station 102, 104, 106 may be able to estimate location parameters (e.g., $\Phi_q$, $\Theta_q$) indicating the relative location of the object 108, 312, 406, 508 compared to each image sensor 114, 116, 202.1-N, 300, 402A-J.

The method 600 may be implemented on a computer system, such as the system 100. For example, one or more steps of the method 600 may be implemented by the monitoring station 102, including the location parameter estimator 110, the sensor module 114, and the target detector. One or more steps of the method 600 may also be implemented by the main station 128, including the probability space generator 130, the location estimator 138, and the location tracker 142. The method 600 may also be implemented by a set of instructions stored on a computer readable medium that, when executed by a processor, cause the computer system to perform the method. For example, all or part of the method 400 may be implemented by the CPUs 124, 146 and the memories 126, 150. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with the image sensor 114, 116, 202.1-N, 300, 402A-J capturing an image of the monitoring are (block 602). The image sensor 114, 116, 202.1-N, 300, 402A-J may capture the image automatically. For example, the image sensor 114, 116, 202.1-N, 300, 402A-J may be configured to capture an image of the monitoring area at regular intervals. In other implementations, the monitoring station 102, 104, 106 may include a motion sensor and the image sensor 114, 116, 202.1-N, 300, 402A-J may capture an image when motion is detected by the motion sensor.

The target detector 120 may then detect an object within the image (block 604). As discussed above, the target detector 120 may detect the object within the image based on pixel levels within the image, e.g., by identifying a pixel or pixels within the image that change color to a same or similar color. For example, if the image sensor 114, 116, 202.1-N, 300, 402A-J is configured to capture images at regular intervals, the target detector 120 may detect an object if the image changed such that a pixel or pixels darken relative to a previous image. Other implementations may utilize, for example, machine learning models to detect objects such as drones that enter the image. The location parameter estimator 110 may then estimate location parameters of the object relative to the image sensor 114, 116, 202.1-N, 300, 402A-J and/or the monitoring station 102, 104, 106 (block 606). For example, the location parameter estimator 110 may estimate an azimuthal and/or an elevation angle of the object relative to the image sensor 114, 116, 202.1-N, 300, 402A-J. Azimuthal and elevation angles may be selected because of the angular geometry of the field of view. In such implementations, the monitoring area may be divided into a three-dimensional array, such as the three-dimensional grid formed by the planes 510, 512, 514 discussed above. Each pixel of the grid that is detected as a part of the object 108, 312, 406, 508 may be located in the three-dimensional grid and may be identified by a coordinate (x, y, z) within the grid. To calculate the azimuth angle ($\phi_{p,q}$) of a pixel at corresponding to an object 108, 312, 406, 508 located at coordinate (x,y,z) relative to a selected image sensor 114, 116, 202.1-N, 300, 402A-J positioned at coordinate ($x_p^q, y_p^q, z_p^q$) with a horizontal pointing angle of $\Phi_{pq}$ and an elevation pointing angle of $\Theta_{pq}$, the location parameter estimator 110 may use the formula:

$$\phi_{p,q} = \tan^{-1}\left(\frac{y - y_p^q}{x - x_p^q}\right) - \Phi_{pq}$$

The elevation angle $\theta_{p,q}$ of the pixel in a particular plane 510, 512, 514 may computed as:

$$\theta_{pq} = \tan^{-1}\left(\frac{z - z_p^q}{\sqrt{(x - x_p^q)^2 + (y - y_p^q)^2 + (z - z_p^q)^2}}\right) - \Phi_{pq}$$

The distance $R_{p,q}$ may be computed as:

$$R_{p,q} = \sqrt{(x - x_p^q)^2 + (y - y_p^q)^2 + (z - z_p^q)^2}$$

The object 108, 312, 406, 508 is located at coordinates ($x_T, y_T, z_T$). The object 108, 312, 406, 508 might be detected by more than one sensor module 502, 504, 506 at each spherical mounted camera. Accordingly, the method 600 may be performed to calculate estimated coordinates of the target ($\widehat{x_T}, \widehat{y_T}, \widehat{z_T}$). In one example, each sensor module 502, 504, 506 has a plurality of image sensors 114, 116, 202.1-N, 300, 402A-J (e.g., N image sensors) placed on a spherical sensor module 502, 504 (e.g., the sensor modules 200, 400) at coordinate ($x_p, y_p, z_p$). Each image sensor 114, 116, 202.1-N, 300, 402A-J may have different pointing directions (e.g., $\{(\Phi_{p,1}, \Theta_{p,1}), (\Phi_{p,2}, \Theta_7), \ldots, (\Phi_{p,n}, \Theta_{p,n}), \ldots, (\Phi_{p,N}, \Theta_{p,N})\}$). Once an image sensor 114, 116, 202.1-N, 300, 402A-J of the sensor module 502, 504 detects the object 108, 312, 406, 508 in its detection region, the azimuthal and elevational mean angle and their spread may be estimated.

The azimuth and elevation angles of pixels covering the detected target at each time t as the object 108, 312, 406, 508 moves may be computed relative to the pointing direction of each particular detecting sensor as described earlier. When the object 108, 312, 406, 508 is detected as corresponding to more than one pixel of an image captured by an image sensor 114, 116, 202.1-N, 300, 402A-J, the azimuth and elevation angles may be computed for each pixel detected as corresponding to the object 108, 312, 406, 508 within the image. The azimuth and elevation angles for the object 108, 312, 406, 508 may then be calculated by averaging the calculated angles for each pixel corresponding to the detected object 108, 312, 406, 508. Additionally, each detecting image sensor 114, 116, 202.1-N, 300, 402A-J may estimate the azimuthal and elevational angles corresponding to the object 108, 312, 406, 508 relative to their respective pointing directions. These mean values of each image sensor 114, 116, 202.1-N, 300, 402A-J (denoted as q in the mathematical notation) at each respective location (denoted as p in the mathematical notation) at coordinates $(x_p^q, y_p^q, z_p^q)$, may be correspondingly denoted as $(\overline{\phi_{p,q}}, \overline{\theta_{p,q}})$. These time varying estimated mean values and their time stamp may be denoted, $(t, \overline{\phi_{p,q}}(t), \overline{\theta_{p,q}}(t))$. At each time, the corresponding pointing direction $(\Phi_{p,q}, \Theta_{p,q})$ may be transmitted from the monitoring station 102, 104, 106 containing the sensor module 502, 504 to the main station 128 for processing.

The monitoring station 102, 104, 106 may then transmit the estimated location parameters 121 to the main station 128 (block 608). For example, the monitoring station 102, 104, 106 may transmit the estimated location parameters to the maintenance station via the communication link. In certain implementations, the monitoring station 102, 104, 106 may transmit the estimated location parameters 112 from each image sensor 114, 116, 202.1-N, 300, 402A-J individually. In other implementations, the estimated location parameters 112 for each image sensor 114, 116, 202.1-N, 300, 402A-J in a single sensor module may be collected and/or combined prior to transmission. When tracking the location of an object 108, 312, 406, 508 over time, the monitoring station 102, 104, 106 may be configured to transmit the estimated location 110 for each image once estimated. Such regular and repeated transmission may enable more up to date location estimations, and thereby more reactive tracking.

Although depicted in the singular, the method 600 may be performed by monitoring station 102, 104, 106 to process a plurality of images collected by a plurality of image sensors 114, 116, 202.1-N, 300, 402A-J from a sensor module 114, 200, 400. In performing this method 600 on a plurality of images captured by a plurality of image sensors 114, 116, 202.1-N, 300, 402A-J, the monitoring station 102, 104, 106 may be configured to perform this method 600 in sequence (i.e., on each image captured by each image sensor 114, 116, 202.1-N, 300, 402A-J individually), or may be configured to perform this method 600 in parallel (i.e., on more than one image captured by multiple image sensors 114, 116, 202.1-N, 300, 402A-J at the same time). For example, the monitoring station 102, 104, 106 may be configured to perform this method 600 at regular time intervals to track the location of the object 108, 312, 406, 508 over time. Additionally, the system 100 may include additional monitoring stations 102, 104, 106 which are also configured to perform the method 600 to estimate location parameters and transmit location parameters to the main station. For example, including additional monitoring stations 102, 104, 106 may increase the accuracy of the estimated location, as described above. The main station 128 may therefore be configured to receive location parameters from more than one monitoring station. For example, the main station 128 may be configured to receive location parameters from the monitoring stations 102, 104, 106 as the respective location parameters are estimated, or maybe configured to receive the estimated location parameters at regular time intervals, such as the regular time interval for which the image sensors capture images.

Figure 7:
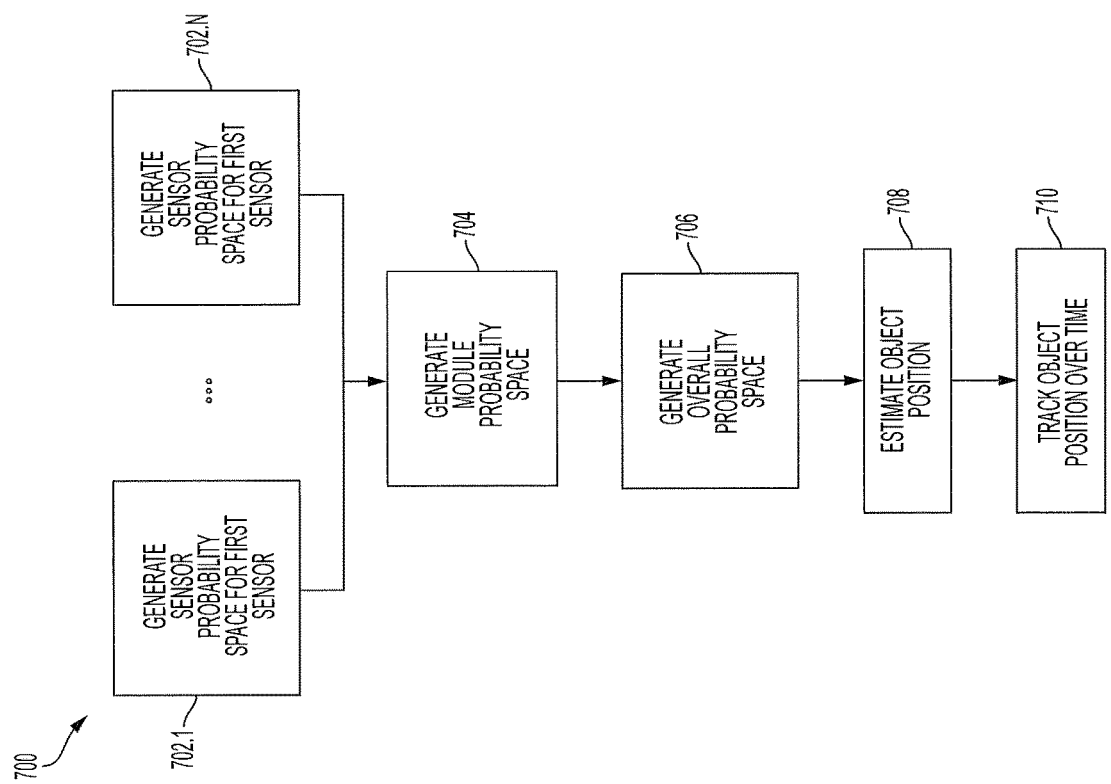
FIG. 7 illustrates a method according to an exemplary embodiment of the present disclosure.

FIG. 7 depicts a method 700 according to an exemplary embodiment of the present disclosure. The method 700 may be performed to estimate the location of an object 108, 312, 406, 508 based on one or more estimated location parameters 112. For example, the main station 128 may perform the method 700 to estimate the location of a target based on estimated location parameters 112 received from one or more monitoring stations. In such implementations, the estimated location parameters 112 may include a single estimate location parameter 110 for each monitoring station 102, 104, 106 or may include multiple estimated location parameters 112 each monitoring station 102, 104, 106 (e.g., where the monitoring station 102, 104, 106 includes a sensor module 114, 200, 400 containing a plurality of image sensors 114, 116, 202.1-N, 300, 402A-J). In certain implementations, the method 700 may be performed after the method 600 based on the estimated location parameters 112 created and transmitted during the performance of that method.

The method 700 may be implemented on a computer system, such as the system 100. For example, one or more steps of the method 700 may be implemented by the monitoring station 102, including the location parameter estimator 110, the sensor module 114, and the target detector. One or more steps of the method 700 may also be implemented by the main station 128, including the probability space generator 130, the location estimator 110, and the location tracker 142. The method 700 may also be implemented by a set of instructions stored on a computer readable medium that, when executed by a processor, cause the computer system to perform the method. For example, all or part of the method 700 may be implemented by the CPUs 124, 146 and the memories 126, 150. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 may begin with the probability space generator 130 of the main station 128 generating a probability space for each of N image sensors (e.g., each sensor of a sensor module) (blocks 702.1-702.N). The sensor probability space 132 may indicate a plurality of potential estimated locations of the object 108, 312, 406, 508 based on the estimated location parameters generated based on the image captured by each sensor 114, 116, 202.1-N, 300, 402A-J. For example, if the object 108, 312, 406, 508 corresponds to multiple pixels of the captured image, the monitoring station 102, 104, 106 may estimate multiple location parameters, as discussed above in connection with the method 600.

In certain embodiments, the probability space of an object 108, 312, 406, 508 at time t may be computed in the three-dimensional grid by computing the angular probability in horizontal and vertical angles. The horizontal angular probability space $P_{p,q}^H(t, \phi)$ of an object 108, 312, 406, 508 at a particular pixel in image of an image sensor 114, 116, 202.1-N, 300, 402A-J (denoted as q) at position (denoted as p) may be calculated by the probability space generator 130 as:

$$P_{p,q}^H(t, \phi) = e^{-\frac{(\phi-(\Phi_{p,q}-\overline{\phi_{p,q}(t)}))^2}{2(\sigma_{\phi_{p,q}}(t))^2}}$$

The vertical angular probability space $P_{p,q}^V(t, \theta)$ of an object 108, 312, 406, 508 at a particular pixel in image of camera q at position p may be calculated by the probability space generator 130 as:

$$P_{p,q}^V(t, \theta) = e^{-\frac{(\theta-(\Theta_{p,q}-\overline{\theta_{p,q}(t)}))^2}{2(\sigma_{\theta_{p,q}}(t))^2}}$$

In each of the above equations, t refers to the calculations that occur at different times. For example, the calculation may be performed at multiple times to track the object 108, 312, 406, 508's location over time. When performing the calculation at a single time (e.g., based on estimated location parameters received at the same time), the probability space may be calculated using the received estimated location parameters 112 corresponding to that time.

For implementations with sensor modules 114, 200, 400 containing multiple image sensors, the probability space generator 130 may then generate a probability space for each sensor module (block 704). The module probability space 1334 may indicate a plurality of potential estimated locations of the object 108, 312, 406, 508 based on the sensor probability spaces 132. For example, if each sensor module 114, 200, 400 includes N image sensors, the horizontal angular probability $P_p^H(t, \phi)$ for each sensor (denoted as p) may be calculated by the probability space generator 130 as:

$$P_p^H(t, \phi) = e^{-\sum_{n=1}^N \frac{(\phi-(\Phi_{in}-\overline{\phi_{p,n}(t)}))^2}{2(\sigma_{\phi_{p,n}}(t))^2}}$$

The vertical angular probability $P_p^V(t, \theta)$ for each sensor may be calculated by the probability space generator 130 as:

$$P_p^V(t, \theta) = e^{-\sum_{n=1}^N \frac{(\phi-(\Phi_{in}-\overline{\phi_{p,n}(t)}))^2}{2(\sigma_{\phi_{p,n}}(t))^2}}$$

For implementations with multiple sensor modules (e.g., multiple sensor modules to increase accuracy), blocks 702.1-702.N and 704 may be repeated (or performed in parallel) for the additional sensor modules 114, 200, 400 and the image sensors corresponding to each additional sensor module 114, 200, 400. Additionally, the probability space generator 130 may generate an overall probability space 136 for the object 108, 312, 406, 508's position (block 706). The overall probability space 136 may be generated based on the probability space or spaces for the sensor modules 114, 200, 400 and/or based on the probability space or spaces for the image sensors 114, 116, 202.1-N, 300, 402A-J. The overall probability space 136 may indicate an overall plurality of potential estimated locations of the object 108, 312, 406, 508.

In certain implementations, the overall horizontal angular probability space may be calculated by the probability space generator 130 as:

$$P^H(t, \phi) = e^{-\sum_{p=1}^M \sum_{n=1}^N \frac{(\phi-(\Phi_{p,n}-\overline{\phi_{p,n}(t)}))^2}{2(\sigma_{\phi_{p,n}}(t))^2}}$$

The overall vertical angular probability space may be calculated by the probability space generator 130 as:

$$P^V(t, \theta) = e^{-\sum_{p=1}^M \sum_{n=1}^N \frac{(\theta-(\Theta_{p,n}-\overline{\theta_{p,n}(t)}))^2}{2(\sigma_{\theta_{p,n}}(t))^2}}$$

The above equations assume that there are M sensor modules 114, 200, 400 (e.g., spherical mounts) at different locations. Additionally, the above implementation formulas assume that each sensor module 114, 200, 400 has the same number of image sensors 114, 116, 202.1-N, 300, 402A-J (i.e., N image sensors). If this assumption is not correct, similar implementations may be used by first summing over the total number of image sensors for each sensor module 114, 200, 400.

The location estimator 138 may then estimate a 3-D physical location 140 for the object 108, 312, 406, 508 (block 708). The location estimator 138 may estimate the 3-D physical location 140 for the object 108, 312, 406, 508 based on the overall probability space 136 generated by the probability space generator 130. The estimated 3-D physical location 140 may be denoted ($\widehat{x_T}, \widehat{y_T}, \widehat{z_T}$) for each time t. The estimated 3-D physical location 140 may be estimated based on the expected value or maximum value of the overall probability space. For example, the horizontal plane coordinates, ($\widehat{x_T}, \widehat{y_T}$), may be estimated from the overall horizontal probability space as:

$$(\widehat{x_T(t)}, \widehat{y_T(t)}) = \max_{x,y}\left(e^{-\sum_{p=1}^M \sum_{n=1}^N \frac{(\phi-(\Phi_{p,n}-\overline{\phi_{p,n}(t)}))^2}{2(\sigma_{\phi_{p,n}}(t))^2}}\right)$$

The vertical plane coordinate, $\widehat{z_T}$, may be estimated from the overall vertical probability space as follows $$\widehat{z_{T(t)}} = \max_z\left(e^{-\sum_{p=1}^M \sum_{n=1}^N \frac{(\theta-(\Theta_{p,n}-\overline{\theta_{p,n}(t)}))^2}{2(\sigma_{\phi_{p,n}}(t))^2}}\right)_{x=\widehat{x_T}, y=\widehat{y_T}}$$

The estimated coordinate ($\widehat{x_T(t)}, \widehat{y_T(t)}, \widehat{z_T(t)}$) may then be used to estimate spherical coordinates ($\widehat{r(t)}, \widehat{\phi(t)}, \widehat{\theta(t)}$) of the object 108, 312, 406, 508 relative to a reference point ($x_o, y_o, z_o$) may be estimated. For example, the radial distance $\widehat{r(t)}$ from the reference point may be estimated by the location estimator as:

$$\widehat{r(t)} = \sqrt{(\widehat{x_T(t)}-x_o)^2+(\widehat{y_T(t)}-y_o)^2+(\widehat{z_T(t)}-z_o)^2}.$$

Similarly, the estimated azimuth angle $\widehat{\phi(t)}$ from the reference point may be estimated by the location estimator as:

$$\widehat{\phi(t)} = \tan^{-1}\left(\frac{\widehat{y_T(t)}-y_o}{\widehat{x_T(t)}-x_o}\right)$$

The estimated elevation angle $\widehat{\theta(t)}$ from reference points may be estimated by the location estimator as:

$$\widetilde{\theta(\bar{t})} = \tan^{-1}\left(\frac{\vec{z}_T(\bar{t}) - z_0}{\sqrt{(\vec{x}_T(\bar{t}) - x_0)^2 + (\vec{y}_T(\bar{t}) - y_0)^2 + (\vec{z}_T(\bar{t}) - z_0)^2}}\right)$$

Once the 3-D physical location 140 of the object 108, 312, 406, 508 is estimated, the system 100 may continue to track the object's position over time (block 710). As the target moves to a new position the coordinates becomes $(\hat{r}+\Delta\hat{r}, \hat{\phi}+\Delta\hat{\phi}, \hat{\theta}+\Delta\hat{\theta})$, where $\Delta\hat{r}$, $\Delta\hat{\phi}$, and $\Delta\hat{\theta}$ respectively represent the change in radial distance, azimuth angle, and elevation angle of the object 108, 312, 406, 508 over time. To track the target the main station 128 may use a tracking algorithm, such as a tracking algorithm based on a state space representation (e.g., the state machine 144 of the location tracker 142) that describes the dynamicity of one or more location parameters. In such implementations, the main station 128 may be able to operate under an assumption that the object follows a particular path and that the change in location parameters are correlated in subsequent estimations.

For example, the algorithm may be implemented as a Gauss-Markov model, such as:

$$p(\Omega_{k+1}/\Omega_k, \Omega_{k-1}, \ldots, \Omega_0) = p(\Omega_{k+1}/\Omega_k).$$

The state vectors $\Omega$ may represent the location parameters. For example, $\Omega$ may be defined such that $\Omega = [r^T \Delta r^T \varphi^T \Delta\varphi^T \theta^T \Delta\theta^T]^T$, which includes both the current estimated location and the rate of change vector of parameters $\Delta\Omega = [\Delta r^T \Delta\phi^T \Delta\theta^T]^T$.

The state machine 144 may be further adapted as an Extended Kalman Filter to continue tracking the object's location. Such an implementation may provide linear, zero mean, and stationary state transition process. For example, a state transition may be implemented as $\Omega_k = \Phi_k \Omega_{k-1} + v_k$, where $\Phi$ is the state transition matrix to provide linear prediction $\Omega_{k/k} = \Omega_{k/k-1} + \Delta\Omega_{k/k-1}$ of the structural parameters and $v_k \sim \mathcal{N}(0, Q)$ is the state noise with covariance matrix Q. Accordingly, the updating function may be written as $\hat{\Omega}_{(k/k)} = \hat{\Omega}_{(k/k-1)} + P_{(k/k)} q(y_k/\hat{\Omega}_{(k/k-1)}, R_k)$, where $P_{(k/k)} = (P_{(k/k)}^{-1} + J(\hat{\Omega}_{(k/k-1)}, R_k))^{-1}$.

Figure 8:
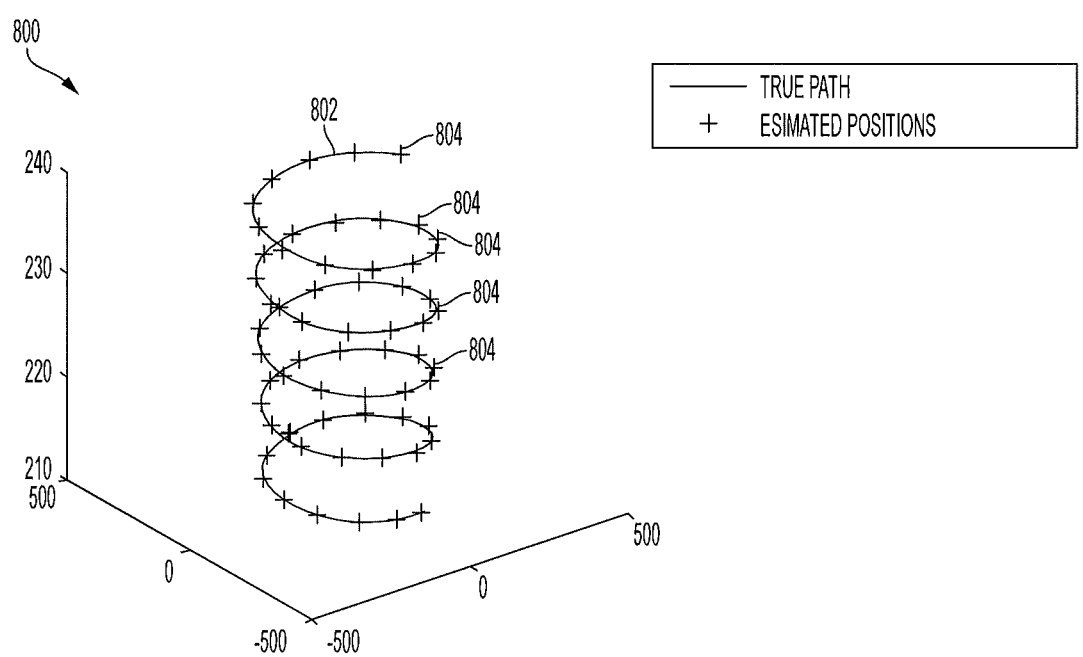
FIG. 8 illustrates a prediction comparison according to an exemplary embodiment of the present disclosure.

FIG. 8 depicts a prediction comparison 800 according to an exemplary embodiment of the present disclosure. The comparison 800 includes a path 802 that may be followed by an object 108, 312, 406, 508 (e.g., a drone) that varies in x, y, and z directions. The comparison also includes the estimated positions 804 generated by the above-described algorithm. As can be seen, the estimated positions 804 accurately follow the path 804 in x, y, and z directions.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for identifying an object in a three-dimensional (3-D) space, comprising:
   calculating, with a first image from a first image sensor, first estimated location parameters of the object relative to the first image sensor at a first time, the first estimated location parameters of the object including a first azimuthal angle of the object relative to the first image sensor and a first elevation angle of the object relative to the first image sensor;
   calculating, with a second image from a second image sensor, second estimated location parameters of the object relative to the second image sensor at the first time, the second estimation location parameters of the object including a second azimuthal angle of the object relative to the second image sensor and a second elevation angle of the object relative to the second image sensor; and
   combining the first and second estimated location parameters to determine first physical location parameters of the object at the first time,
   wherein the first image sensor and the second image sensor are included within a first sensor module comprising a plurality of image sensors arranged in a spherical orientation, and wherein combining the first and second estimated location parameters comprises:
   calculating a first horizontal angular probability space for the object relative to the first sensor module based on the first azimuthal angle of the object relative to the first image sensor and the second azimuthal angle of the object relative to the second image sensor; and
   calculating a first vertical angular probability space for the object relative to the first sensor module based on the first elevation angle of the object relative to the first image sensor and the second elevation angle of the object relative to the second image sensor.

2. The method of claim 1, further comprising:
   calculating, with a third image from a third image sensor, third estimated location parameters of the object relative to the third image sensor at the first time, and
   wherein determining the first physical location parameters of the object at the first time further comprises combining the first, second, and third estimated location parameters.

3. The method of claim 2, wherein the first, second, and third image sensors are all located at a first monitoring station, and wherein the first physical location parameters of the object are relative to the first monitoring station.

4. The method of claim 3, further comprising:
   receiving, from a second monitoring station, second physical location parameters of the object relative to the second monitoring station; and
   combining the first and second physical location parameters to generate an estimated physical location of the object in the 3-D space.

5. The method of claim 4, further comprising:
   receiving, from a third monitoring station, third physical location parameters of the object relative to the third monitoring station,
   wherein determining the estimated physical location further comprises combining the first, second, and third physical location parameters.

6. The method of claim 5,
wherein the first physical location parameters comprise a first physical location probability space,
wherein the second physical location parameters comprise a second physical location probability space,
wherein the third physical location parameters comprise a third physical location probability space, and
wherein determining the estimated physical location further comprises:
calculating an overall probability space relative to the first, second, and third monitoring stations based on the first, second, and third physical location probability spaces; and
selecting the maximum value of the overall probability space as the estimated location.

7. The method of claim 1,
wherein calculating the first estimated location parameters comprises calculating a first probability space of the location of the object relative to the first image sensor,
wherein calculating the second estimated location parameters comprises calculating a second probability space of the location of the object relative to the second image sensor, and
wherein calculating the first physical location parameters comprises:
calculating a physical location probability space of the location of the object relative to the first and second image sensors based on the first and second probability spaces; and
calculating a maximum value of the physical location probability space.

8. The method of claim 1, further comprising:
repeating the steps of the method to calculate fourth physical location parameters of the object relative to the first and second image sensors at a second time.

9. The method of claim 8, further comprising:
storing the first and fourth physical location parameters at the first time and the second time, respectively.

10. The method of claim 8, further comprising determining the fourth physical location parameters of the object at the second time based on the first physical location parameter by:
representing the first physical location parameters with a first state vector of a state machine;
calculating a state transition based on the first state vector and a rate of change vector;
applying the state transition to the first state vector to generate a second state vector; and
calculating the fourth physical location parameters based on the second state vector.

11. The method of claim 1, wherein one or both of the first and second image sensor include a spherical arrangement of multiple cameras.

12. The method of claim 11, wherein the one or both of the first and second image sensors are implemented as a sensor selected from the group consisting of an optical sensor, an electro-optical (EO) sensor, and an infrared (IR) sensor.

13. The method of claim 1, wherein the first physical location parameters include at least two horizontal coordinates and a vertical coordinate, and wherein combining the first and second estimated location parameters further comprises:
calculating the at least two horizontal coordinates based on the first horizontal angular probability space for the object relative to the first sensor module and at least one second horizontal angular probability space for the object relative to at least one second sensor module; and
calculating at least one vertical coordinate based on the first vertical angular probability space for the object relative to the first sensor module and at least one second vertical angular probability space for the object relative to the at least one second sensor module.

14. A system for identifying an object in three-dimensional (3-D) space, comprising:
a sensor module comprising a plurality of image sensors arranged in a spherical orientation, the plurality of image sensors including a first image sensor and a second image sensor;
a location parameter estimator configured to:
calculate, with a first image from the first image sensor, first estimated location parameters of the object relative to the first image sensor at a first time, the first estimated location parameters of the object including a first azimuthal angle of the object relative to the first image sensor and a first elevation angle of the object relative to the first image sensor; and
calculate, with a second image from the second image sensor, second estimated location parameters of the object relative to the second image sensor at the first time, the second estimation location parameters of the object including a second azimuthal angle of the object relative to the second image sensor and a second elevation angle of the object relative to the second image sensor; and
a main station configured to:
combine the first and second estimated location parameters to determine first physical location parameters of the object at the first time relative to the sensor module by:
calculating a first horizontal angular probability space for the object relative to the sensor module based on the first azimuthal angle of the object relative to the first image sensor and the second azimuthal angle of the object relative to the second image sensor; and
calculating a first vertical angular probability space for the object relative to the sensor module based on the first elevation angle of the object relative to the first image sensor and the second elevation angle of the object relative to the second image sensor.

15. The system of claim 14, further comprising:
a target detector configured to detect object locations within images based on pixel values of occupied pixels of the images.

16. The system of claim 14, wherein the sensor module further comprises a third image sensor,
wherein the location parameter estimator is further configured to calculate, with a third image from the third image sensor, third estimated location parameters of the object relative to the third image sensor at the first time, and
wherein the main station is further configured to combine the first, second, and third estimated location parameters to determine the first physical location parameters of the object at the first time.

17. The system of claim 16, wherein the sensor module is located at a first monitoring station.

18. The system of claim 17, further comprising a second monitoring station and a third monitoring station, wherein the main station is further configured to:

receive, from the second monitoring station, second physical location parameters of the object relative to the second monitoring station;

receive, from a third monitoring station, third physical location parameters of the object relative to the third monitoring station; and combine the first and second physical location parameters to generate an estimated physical location of the object in the 3-D space.

19. The system of claim 14, wherein the location parameter estimator, when calculating the first and second estimated locations, is configured to:

calculate a first probability space of the location of the object relative to the first image sensor; and calculate a second probability space of the location of the object relative to the second image sensor, and wherein the main station, when determining the first physical location parameters, is configured to:

calculate a physical location probability space of the location of the object relative to the sensor module based on the first and second probability spaces; and calculate a maximum value of the physical location probability space.

20. The system of claim 14, wherein the main station is configured to determine fourth physical location parameters of the object at a second time based on the first physical location parameters, by:

representing the first physical location parameters with a first state vector of a state machine;

calculating a state transition based on the first state vector and a rate of change vector;

applying the state transition to the first state vector to generate a second state vector; and calculating the fourth physical location parameters based on the second state vector.

21. A non-transitory, computer-readable medium storing instructions which, when executed by a processor, cause the processor to:

calculate, with a first image from a first image sensor, first estimated location parameters of an object relative to the first image sensor at a first time, the first estimated location parameters of the object including a first azimuthal angle of the object relative to the first image sensor and a first elevation angle of the object relative to the first image sensor;

calculate, with a second image from a second image sensor, second estimated location parameters of the object relative to the second image sensor at the first time, the second estimation location parameters of the object including a second azimuthal angle of the object relative to the second image sensor and a second elevation angle of the object relative to the second image sensor; and combine the first and second estimated location parameters to determine first physical location parameters of the object at the first time, wherein the first image sensor and the second image sensor are included within a sensor module comprising plurality of image sensors arranged in a spherical orientation, and wherein combining the first and second estimated location parameters comprises:

calculating a first horizontal angular probability space for the object relative to the sensor module based on the first azimuthal angle of the object relative to the first image sensor and the second azimuthal angle of the object relative to the second image sensor; and calculating a first vertical angular probability space for the object relative to the sensor module based on the first elevation angle of the object relative to the first image sensor and the second elevation angle of the object relative to the second image sensor.

* * * * *